Nov. 10, 1925.

N. L. MORTENSEN 1,560,600

CONTROLLER FOR ELECTRIC MOTORS

Filed April 17, 1924

INVENTOR
Niels L. Mortensen
BY
Frank H. Hubbard
ATTORNEY

Patented Nov. 10, 1925.

1,560,600

UNITED STATES PATENT OFFICE.

NIELS L. MORTENSEN, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR ELECTRIC MOTORS.

Application filed April 17, 1924. Serial No. 707,031.

*To all whom it may concern:*

Be it known that I, NIELS L. MORTENSEN, a citizen of the United States, residing at Milwaukee, in the county of Milwaukee and State of Wisconsin, have invented new and useful Improvements in Controllers for Electric Motors, of which the following is a full, clear, concise, and exact description, reference being had to the accompanying drawing, forming a part of this specification.

This invention relates to controllers for electric motors and is applicable particularly to hoist or crane operating motors.

The present invention is in the nature of an extension or improvement of that set forth in my prior Patent No. 1,448,563 issued March 13, 1923.

Heretofore, as in said prior patent, it has been proposed to provide special connections for the motor on lowering, such connections including connection of the motor armature and field to the supply circuit in shunt to one another, the polarity of the armature being the reverse of that maintained during hoisting, the foregoing connections thus providing a so-called dynamic loop including said armature and field in series relation to one another. Also the arrangement has been such as to provide for commutation of the accelerating resistance with respect to the aforementioned circuits in a manner such that at each commutation a given value of resistance is cut out of the armature circuit while a corresponding value is simultaneously included in the field branch of the dynamic loop, the resultant effects tending cumulatively toward increased acceleration of the motor.

Under conditions of zero or light negative load the aforementioned reverse connections provide for positive motor action to enable high speed lowering, whereas under heavy negative or overhauling load conditions the motor generates current in the dynamic loop to thereby limit the lowering speed to a safe value preferably approximating that at which the zero or light load is lowered. Moreover in both cases the lowering speed is controllable by resistance commutation as aforedescribed.

However, it has been found in practice that during acceleration for lowering, or at other stages in the lowering action of the motor the holding or braking torque of the latter may be very seriously weakened during the interval wherein the dominant action changes from motor to generator, thereby permitting attainment of high lowering speed under conditions of heavy negative load and particularly if the field has been previously weakened by inclusion of resistance in circuit therewith.

Therefore it has been proposed to employ a switch subjected to control in accordance with the value of the armature current for limiting the amount of field weakening resistance which can be included under given conditions. Such and similar expedients have enabled definite and accurate control of the motor speed under all conditions. However, in the embodiments heretofore produced it has been possible under certain conditions to defeat the protective and safety action of such switch or equivalent means whereby under certain conditions of actuation or mishandling of the controller temporary abnormal lowering speeds for heavy loads have been attainable.

The present invention has among its objects that of overcoming the aforementioned disadvantages of preexisting devices.

Another object is that of providing more positively against attainment of abnormal motor speeds during lowering of heavy loads.

Other objects and advantages will hereinafter appear.

In the accompanying drawing, wherein is illustrated an embodiment of the invention;

Figure 1 is a diagrammatic view thereof; while

Figure 1:
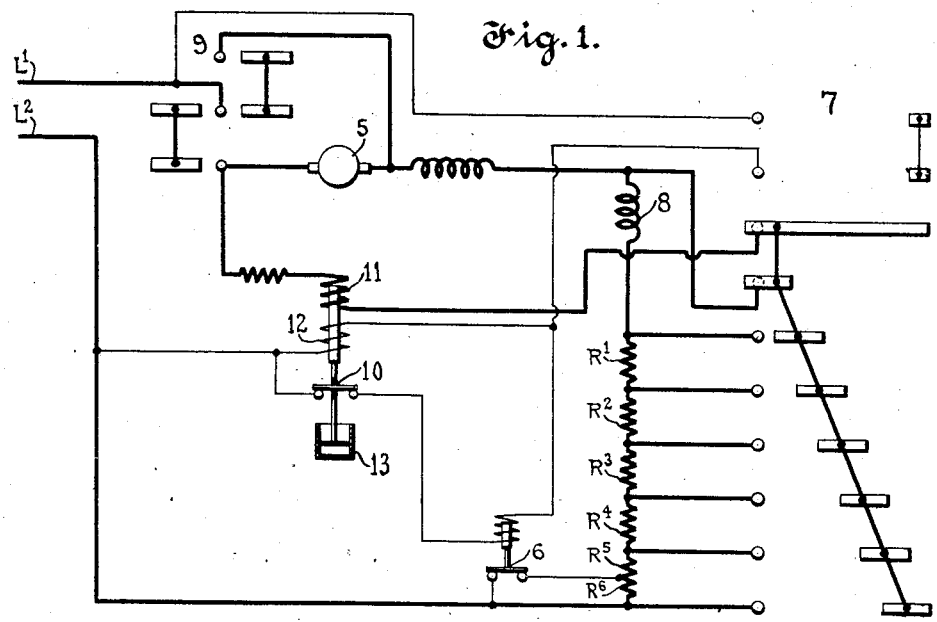

Referring to the drawing, the same illustrates a hoisting motor 5 of the series type to be supplied from lines $L^1$ $L^2$ and provided with steps $R^1$ to $R^5$ of accelerating resistances, an associated resistance step $R^6$ which may comprise a portion of the step $R^5$ being separately commutatable for field regulation by an electroresponsive switch 6. An acceleration drum 7 provides for commutation of resistance steps $R^1$ to $R^5$ and also controls energization of an electromagnetic brake coil 8 in the usual manner. A reversing drum 9 serves to commutate the motor connections for hoisting and lowering selectively, the armature and field being connected for lowering as illustrated in Fig. 2.

A compound relay 10 having series and shunt energizing coils 11 and 12, adapted to act cumulatively under lowering conditions, is arranged to control energization of the opening coil of switch 6, subject however to control by the drum 7, the latter being adapted, as shown in Fig. 1, to enable completion of the circuit of coil 12 and of the opening coil of switch 6 only when the drum occupies its final acceleration position. Moreover, since during hoisting the armature and field have a common circuit from which all the series resistance is excluded on the last position of the drum it is apparent that action of switches 6 and 10 does not influence the motor while the latter is connected for hoisting.

Figure 2:
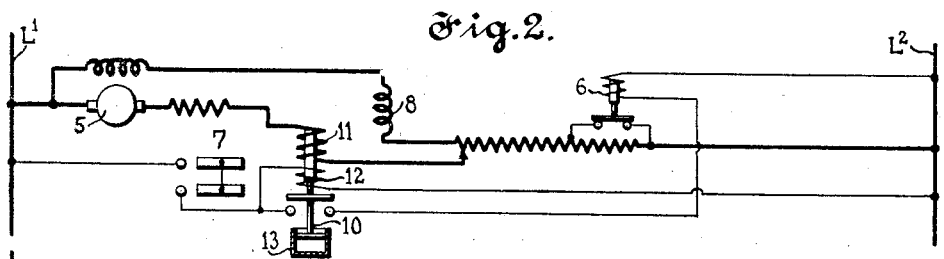
Figs. 2, 3 and 4 are simplified diagrams illustrative of different conditions or stages of the control.
Figure 3:
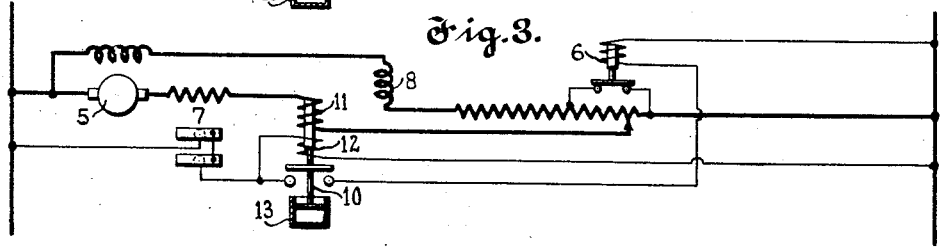
Figure 4:
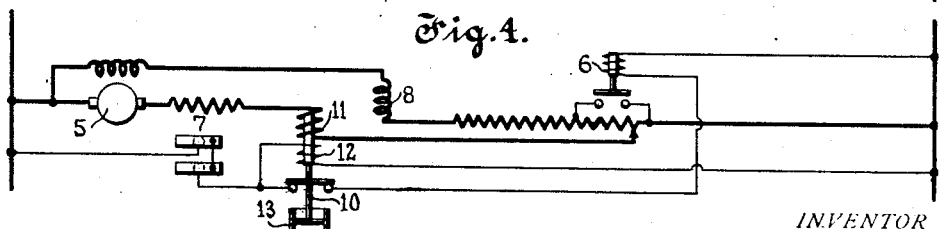

Assuming the controller to be set in the first position lowering, as illustrated in Fig. 2, under conditions of heavy negative load, it is apparent that for each point, except the last, of advance of drum 7 in acceleration direction a step of resistance is cut out of the armature circuit, the same or a corresponding value of resistance being simultaneously cut into the shunt field circuit for field weakening and into the dynamic loop for reducing the dynamic braking action. However, upon the last acceleration point the resistance step $R^6$ is not cut into the field circuit, being short-circuited as to said field circuit by the normally closed switch 6. This relation is illustrated in Fig. 3, which also shows the energizing circuit of coil 12 completed upon the last acceleration point.

Under such conditions, and assuming properly timed advance movements of the drum, relay 10 being subjected to cumulative opening influence of its coils 11 and 12, the former being subjected to the inrush of armature current resulting from the last commutation of armature resistance is adapted to open and remain open until the armature speed and current have subsided to such values as to warrant final weakening of the field. The resultant decrease in energization of coil 11 thus permits relay 10 to close, completing the energizing circuit of switch 6, which thereupon opens and includes resistance step $R^6$ in the field circuit for final field weakening and motor acceleration.

However, upon sudden or premature movement of drum 7 to final acceleration position under the assumed conditions of heavy negative load, the field may become unduly weakened prior to or concurrently with the final transition from driving to braking action of the motor, whereas during such transition period the holding or braking torque of the motor tends to be low as aforedescribed.

Such condition of decreased holding torque is of course accentuated by the concurrent weakened condition of the field, whereby an excessive lowering speed may be attained temporarily, whereas the current traversing coil 11 may be no longer proportional to the armature speed but on the contrary may fall off faster than the speed or even while the latter continues to rise. Under such conditions the switch 10 after opening in the manner intended may release and close prematurely with resultant opening of switch 6, such action still further weakening the field and causing further unwarranted acceleration. Such condition may persist until the armature speed and current become so far excessive as to cause reopening of switch 10 with consequent closing of switch 6 and strengthening of the field. It is moreover to be observed that the armature speed required to generate the current necessary to cause such reopening of switch 10 under the assumed conditions of ultimate field weakening may considerably exceed that at which said switch normally opens with the resistance $R^6$ excluded from the field circuit.

In view of the foregoing, it is herein proposed to provide against such premature closure of switch 10 irrespective of premature movement of drum 7 to its final acceleration position.

To such end said switch is provided with a down-dashing dashpot 13 or equivalent time element device adapted to delay closure of the switch for an interval sufficient to insure stabilization of the speed and electrical conditions of the armature.

Such delay in closing of said switch provides positively against over acceleration arising from the causes and under the conditions described.

What I claim as new and desire to secure by Letters Patent is:

1. The combination with an electric motor having accelerating resistance and control means providing for establishment jointly of power and dynamic circuits for the motor, of associated means providing for commutation of said resistance differently with respect to the power and dynamic circuits of the motor, and means to prevent enactment of certain of said commutations except following a predetermined delay.

2. The combination with an electric motor having accelerating resistance and control means providing for establishment jointly of power and dynamic circuits for the motor, of associated means providing for commutation of said resistance differently with respect to the power and dynamic circuits of the motor, said means including means to include selectable values of said resistance in the field circuit of the motor, and means to limit temporarily the value of such field weakening resistance that may be so included in circuit.

3. The combination with an electric motor having accelerating resistance and control means providing for establishment jointly of power and dynamic circuits for the motor, of means to commutate said resistance differently with respect to the power and dynamic circuits of the motor, said means including means to include selectable values of said resistance in the field circuit of the motor, and means to limit the value of resistance which may be so included during the interval wherein the dominant action of the motor changes from driving to braking action.

4. The combination with an electric motor having accelerating resistance and control means providing for establishment jointly of power and dynamic circuits for the motor, of means to commutate said resistance differently with respect to the power and dynamic circuits of the motor, said means including means to include selectable values of said resistance in the field circuit of the motor, a switch normally short-circuiting a given value of such resistance with respect to said field circuit, and electroresponsive means to cause opening of said switch but subject to a time element after attainment of given electrical conditions of the motor circuit.

5. In a controller for hoists and the like, the combination with a hoisting motor having accelerating resistance, means to establish for the motor power and dynamic circuits jointly for lowering, said means including means to commutate said resistance differently with respect to the motor field and dynamic circuits for accelerated lowering, a switch normally short-circuiting a given value of said resistance with respect to said field circuit, and electroresponsive means to cause opening of said switch for final weakening of the field but subject to positioning of the controller parts for maximum acceleration and also subject to a time element after attainment of given electrical conditions of the armature circuit of the motor.

In witness whereof, I have hereunto subscribed my name.

NIELS L. MORTENSEN.